UNITED STATES PATENT OFFICE.

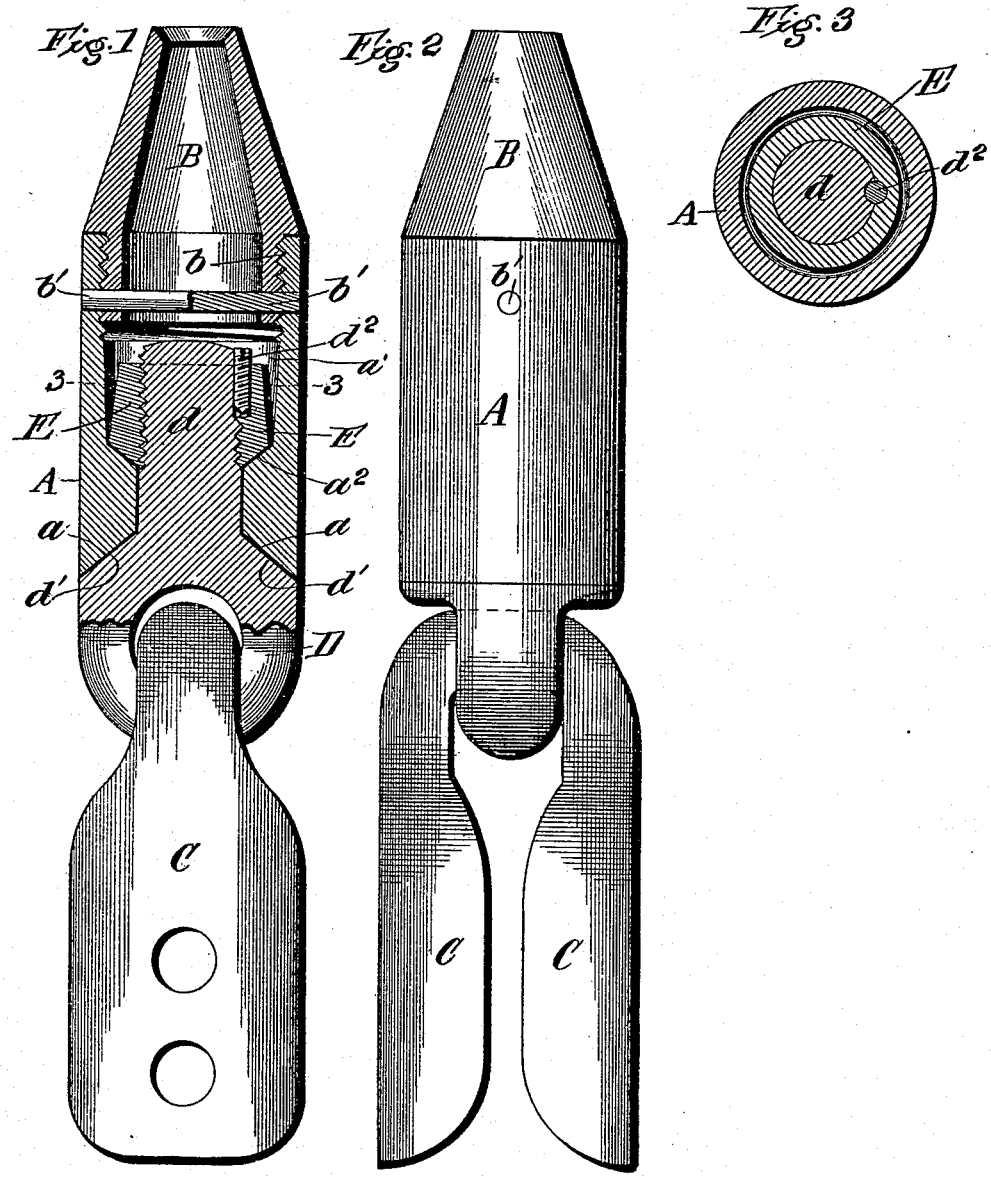

OSCAR EDWARD LINDHOLM, OF ROY, TERRITORY OF NEW MEXICO.

SWIVEL ROPE-SOCKET FOR WELL-DRILLS.

No. 853,706.
Specification of Letters Patent.
Patented May 14, 1907.

Application filed June 27, 1906. Serial No. 323,586.

*To all whom it may concern:*

Be it known that I, OSCAR EDWARD LINDHOLM, a citizen of the United States, and a resident of Roy, in the county of Mora and the Territory of New Mexico, have invented a new and useful Improvement in Swivel Rope-Sockets for Well-Drills, of which the following is a specification.

The cables employed in drilling wells, whether made of wire or manila fiber, are composed of strands each twisted separately and the whole then twisted together. In drilling the cable is under strain when lifting the drill tools, and hence it then untwists to a certain degree so that the drill is turned correspondingly; but when the drill drops, the cable being more or less slack, it twists back or resumes its full twist. A swivel is introduced between the cable and the drill, and when the weight of the drill tools is imposed on the cable, the friction of the swivel prevents it from acting, that is rotating, but when the weight is released, the swivel turns readily. I have devised and put in successful practical use an improved swivel for this purpose.

The details of construction, arrangement, and operation of my invention are as hereinafter described, reference being had to the accompanying drawings in which, Figure 1 is a view in which main portion of my swivel rope-socket is shown in central longitudinal section. Fig. 2 is a side view of the entire rope-socket. Fig. 3 is a horizontal section on the line 3—3 of Fig. 1.

A indicates the cylindrical body of the swivel socket to which the wire rope-socket B, and the manila rope-socket C, are connected. The rope-socket B, is tapered interiorly and exteriorly, and provided with a cylindrical portion $b$ which is threaded and shouldered to adapt it to be screwed into the upper end of the body section A. To prevent its accidental detachment by rotation, a cross-pin $b'$ is inserted through the threaded parts as shown.

In practice, the end of the wire cable is inserted in socket B, and spread at its lower end and secured in place by Babbitt metal. The manila rope-socket C is loosely jointed to a screw-eye D, which is provided with a shoulder $d'$. The latter abuts a corresponding shoulder $a$ formed at the lower end of the body section A. The threaded shank $d$ of the eye D projects into the chamber $a'$ formed in the upper portion of the body section A., and is detachably secured in place by means of the nut E, whose lower end is beveled and abuts a beveled shoulder $a^2$ of the body section A. The nut is also tapered or reduced in diameter from the lower end upwardly so that it does not come in contact with the sides of the chamber $a'$. In order to prevent its accidental detachment it is keyed and secured to the shank $d$ by means of a cylindrical screw $d^2$ the upper end of the same having a nick to receive a screw-driver, by which the screw may be readily inserted or removed. In such case the screw-driver would be inserted through the opening in the top of the coupling.

It is apparent that by the construction and arrangement of parts described, I provide for convenient detachment of the wire rope-socket B, and of the manila rope-socket C, or rather for detachment of the threaded eye D, to which the manila rope-socket C is jointed. I also further provide a bearing for the eye D, which enables it to turn easily in the body section A, at the same time that it may be conveniently detached when required. In brief, I provide an improved swivel rope-socket which is distinguished by simplicity, strength, and durability, also ease of detachment of its parts, and ease of rotation of the rope-sockets relative to each other.

What I claim is—

The improved swivel rope-socket comprising the wire-rope socket which is tapered exteriorly and interiorly, a chambered body section A, with which the said socket is detachably connected, said body having a beveled shoulder at the bottom of its chamber and a corresponding beveled shoulder $a$ in its lower end; the manila rope-socket C, and the screw-eye D with which it is loosely jointed, said screw-eye having a reduced and threaded shank that projects into the chamber of the body, and a beveled shoulder $d'$ corresponding to the exterior shoulder of the body, a nut E applied to the shank of the screw-eye and having its lower end tapered corresponding to the adjacent shoulder of the body, the sides of the nut being inclined inward from the bottom upward; and a locking device applied to the nut for preventing its accidental rotation, substantially as described.

OSCAR EDWARD LINDHOLM.

Witnesses:
JACOB FLOERSHEIM,
LESLIE E. ALLDREDGE.